United States Patent [19]
Maloney et al.

[11] Patent Number: 6,007,158
[45] Date of Patent: *Dec. 28, 1999

[54] VEHICLE WHEEL COVER RETENTION SYSTEM AND METHOD FOR PRODUCING SAME

[75] Inventors: Michael V. Maloney, Belleville; Thomas E. Heck, Monroe; James A. Lumm, Whitmore Lake, all of Mich.; James H. Kemmerer, Sweet Springs, Mo.

[73] Assignee: Hayes Lemmerz International, Inc., Northville, Mich.

[*] Notice: This patent issued on a continued prosecution application filed under 37 CFR 1.53(d), and is subject to the twenty year patent term provisions of 35 U.S.C. 154(a)(2).

[21] Appl. No.: 08/886,264

[22] Filed: Jul. 1, 1997

Related U.S. Application Data

[63] Continuation of application No. 08/389,867, Feb. 23, 1995, Pat. No. 5,664,845, which is a continuation-in-part of application No. 08/203,058, Feb. 28, 1994, Pat. No. 5,435,631.

[51] Int. Cl.$^6$ ...................................................... B60B 7/06
[52] U.S. Cl. ...................................... 301/37.43; 301/37.1
[58] Field of Search ............................... 301/37.1, 37.35, 301/37.36, 37.42, 37.43

[56] References Cited

U.S. PATENT DOCUMENTS

| | | |
|---|---|---|
| 3,517,968 | 6/1970 | Tully et al. . |
| 4,530,542 | 7/1985 | Spiegel et al. . |
| 5,368,370 | 11/1994 | Beam ................................ 301/37.43 X |
| 5,458,401 | 10/1995 | Baccman .............................. 301/37.43 |
| 5,577,809 | 11/1996 | Chase ................................... 301/37.43 |
| 5,597,213 | 1/1997 | Chase ................................... 301/37.43 |
| 5,630,654 | 5/1997 | Chase ................................... 301/37.37 |
| 5,820,225 | 10/1998 | Ferris et al. ..................... 301/37.43 X |
| 5,829,843 | 11/1998 | Elkhoff ................................ 301/37.43 |

FOREIGN PATENT DOCUMENTS 2813412 10/1979 Germany .

*Primary Examiner*—Russell D. Stormer
*Attorney, Agent, or Firm*—MacMillan, Sobanski & Todd, LLC

[57] ABSTRACT

An improved vehicle wheel cover retention system and method for producing the same wherein the wheel includes a disc defining an outboard facing wheel surface and including an outboard tire bead seat retaining flange. The flange includes an outer surface having a circumferential, radially inwardly facing groove formed therein. The groove is defined by a generally axially extending first surface and a second surface angled relative to the first surface. The wheel further includes a wheel cover covering at least a portion of the outboard facing wheel surface. The cover includes an outer annular lip which extends into the groove and is positioned adjacent the first surface. The groove and the lip have a configuration which enables the lip to spring outwardly into the groove when the cover is pressed on the disc. The method for producing the vehicle wheel includes the the steps of: (a) providing a disc defining an outboard facing wheel surface and including an outboard tire bead seat retaining flange, the outboard bead seat retaining flange including an outer surface having a circumferential, radially inwardly facing groove formed therein, the groove defining an inner diameter; (b) providing a wheel cover including an outer annular lip which defines an outer diameter which generally corresponds to the inner diameter of the groove; and (c) moving the disc and the cover toward one another whereby the wheel cover initials deflects inwardly and then expands outwardly into the groove to secure the wheel cover to the disc.

15 Claims, 8 Drawing Sheets

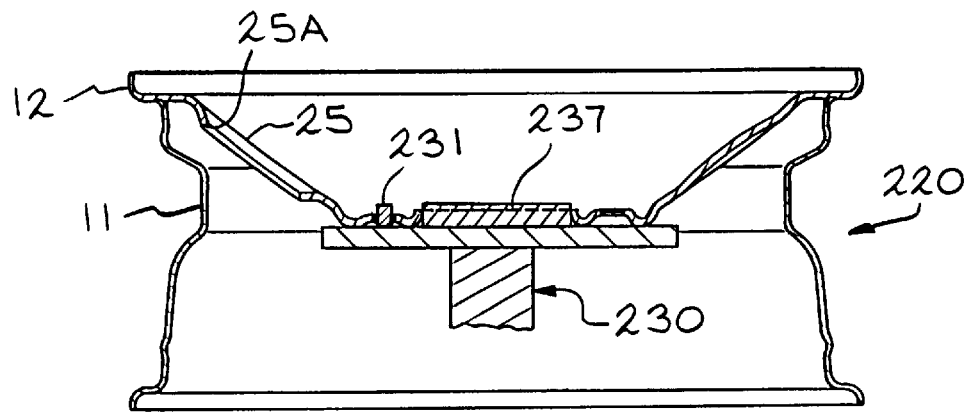
FIG. 11
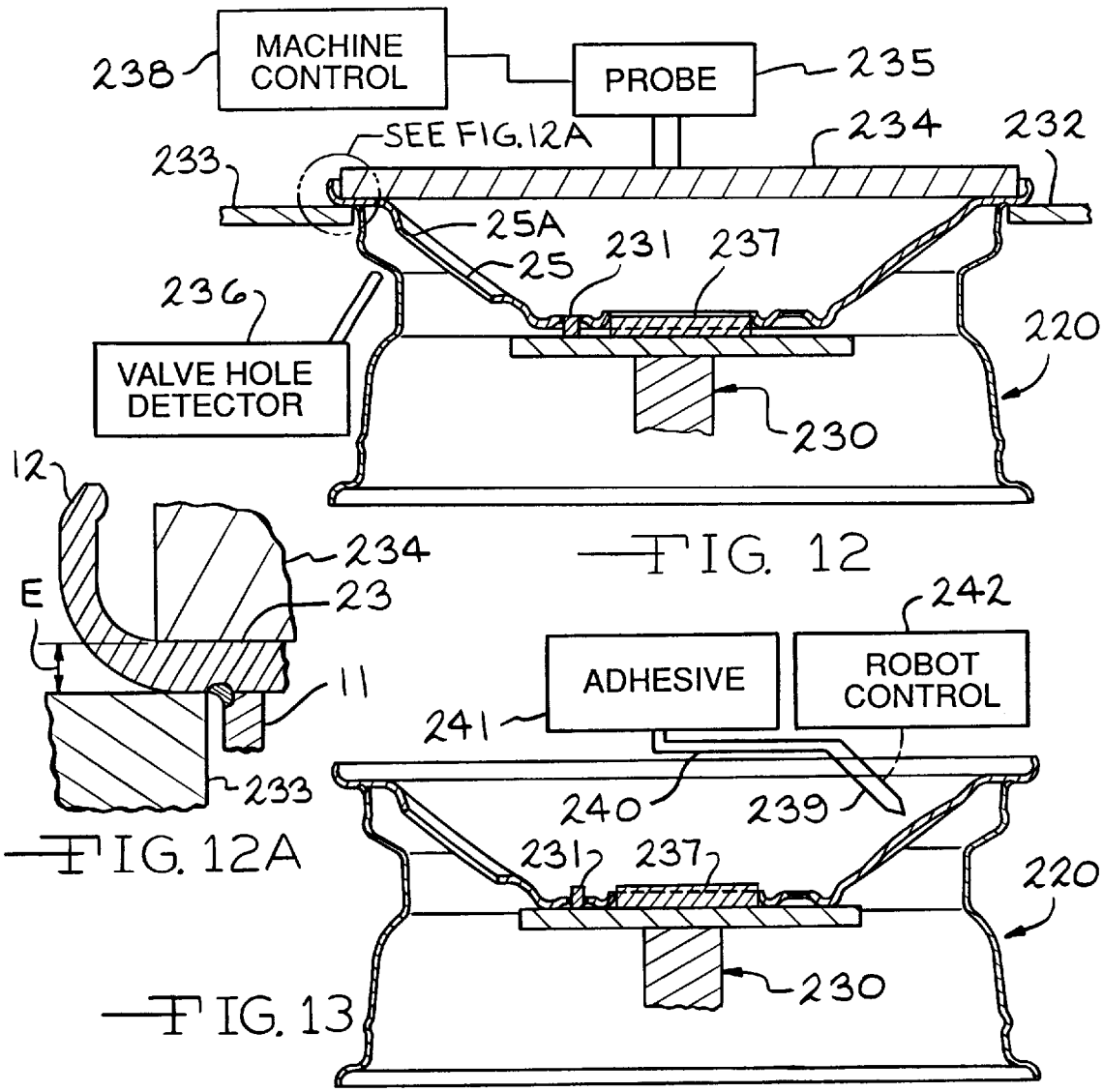
FIG. 12
FIG. 12A
FIG. 13

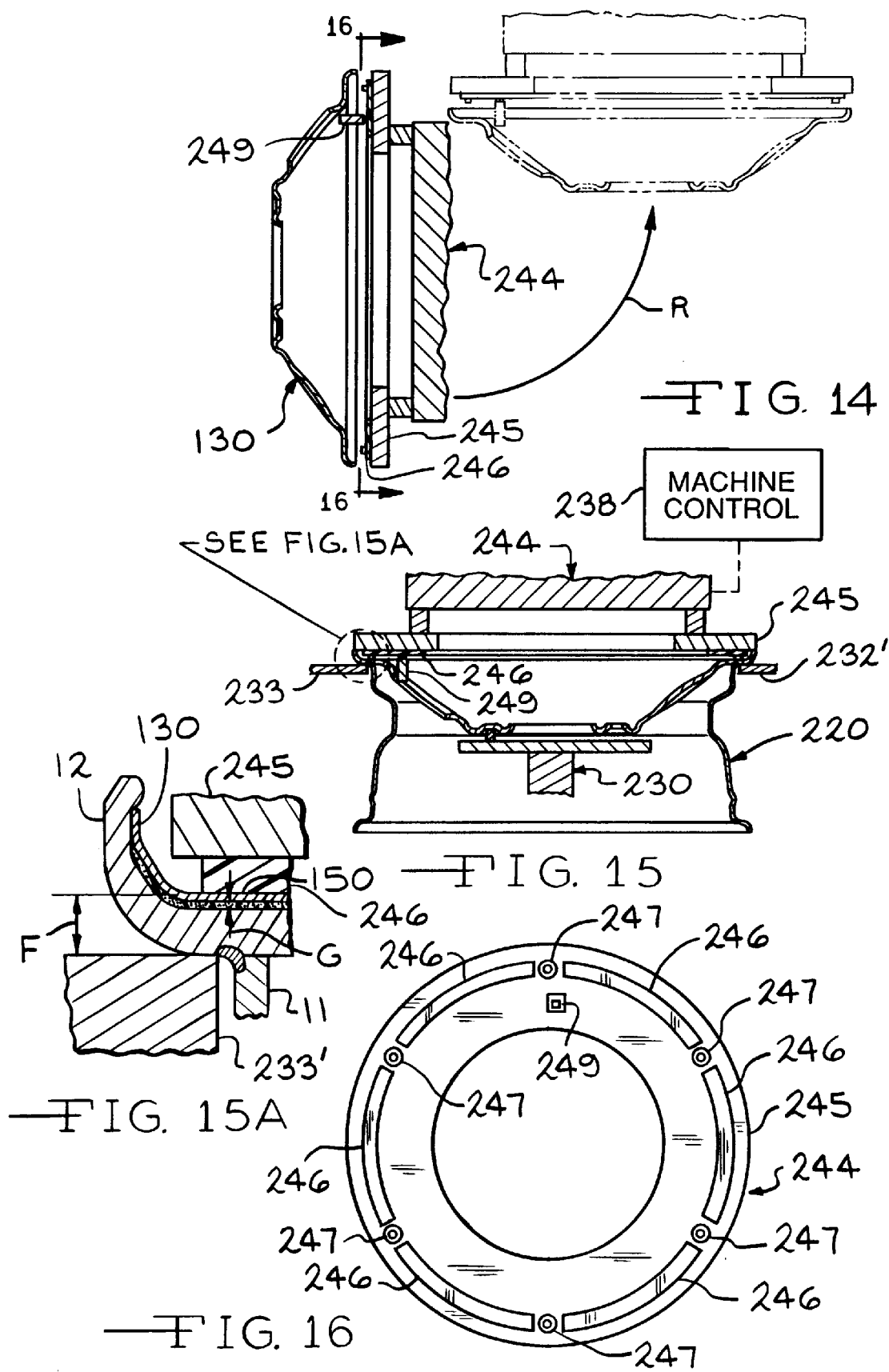

VEHICLE WHEEL COVER RETENTION SYSTEM AND METHOD FOR PRODUCING SAME

This is a continuation of application(s) Ser. No. 08/389,867 filed on Feb. 23, 1995, now U.S. Pat. No. 5,664,845, which is a continuation-in-part of Ser. No. 08/203,058, filed Feb. 28, 1994, now U.S. Pat. No. 5,435,631.

BACKGROUND OF THE INVENTION

This invention relates to vehicle wheels and, in particular, to an improved vehicle wheel cover retention system and method for producing the same.

Full or partial vehicle wheel covers of the removable type are well known, and have been used for many years to enhance the styling of conventional, stamped wheel discs. Also, it is known to permanently secure a full or partial wheel cover to a vehicle wheel using an adhesive material.

One example of a vehicle wheel with a permanently secured wheel cover is disclosed in German Patent 2,813,412. In the German Patent, the edges of the wheel cover are profiled to be clamped or hooked into fitting grooves provided on the outboard face of the wheel to secure the cover to the wheel. Additionally, the cover can also be glue-joined to the wheel.

Another example of a vehicle wheel having a permanently secured wheel cover is disclosed in U.S. Pat. No. 3,669,501 to Derleth. In the Derleth patent, a chrome-plated plastic wheel cover includes an outer peripheral flange which overhangs the outboard tire bead seat retaining flange of the wheel, an inner peripheral flange which seats against an outboard surface of a hub sleeve, and an intermediate portion which is spaced outwardly from the face of the wheel. An expanding adhesive material is applied to the outboard surfaces of the wheel. When the adhesive material is expanded, it is operative to fill the void between the wheel and the wheel cover to permanently secure the wheel cover to the outboard face of the wheel.

A further example of a vehicle wheel having a permanently secured wheel cover is disclosed in U.S. Pat. No. 5,031,966 to Oakey. In the Oakey patent, a cast aluminum wheel cover is secured to a disc of a steel wheel using a high density structural adhesive.

SUMMARY OF THE INVENTION

This invention relates to an improved vehicle wheel cover retention system and method for producing the same. In particular, the vehicle wheel includes a disc defining an outboard facing wheel surface and including an outboard tire bead seat retaining flange. The outboard bead seat retaining flange includes an outer surface having a circumferential, radially inwardly facing groove formed therein. The groove is defined by a generally axially extending first surface and a second surface angled relative to the first surface. The wheel further includes a wheel cover covering at least a portion of the outboard facing wheel surface. The wheel cover includes an outer annular lip which extends into the groove and is positioned adjacent the first surface. The groove and the outer annular lip have a configuration which enables the outer annular lip to spring outwardly into the groove when the cover is pressed on the disc.

The method for producing the vehicle wheel includes the steps of: (a) providing a disc defining an outboard facing wheel surface and including an outboard tire bead seat retaining flange, the outboard bead seat retaining flange including an outer surface having a circumferential, radially inwardly facing groove formed therein, the groove defining an inner diameter; (b) providing a wheel cover including an outer annular lip which defines an outer diameter which generally corresponds to the inner diameter of the groove; and (c) moving the disc and the cover toward one another whereby the wheel cover initials deflects inwardly and then expands outwardly into the groove to secure the wheel cover to the disc. Preferably, prior to performing step (c), an adhesive is applied to one of an outboard facing surface of the disc and an inner surface of the wheel cover and, during step (c), a predetermined spacing is maintained between the outboard facing disc surface and the inner wheel cover surface to effectively enable the adhesive to secure the wheel cover to the disc.

The construction of the vehicle wheel cover retention system is especially advantageous when it is desired to produce a "chrome plated" wheel. It has been found that the cost of forming the cover, chrome plating the cover, and then securing it to the disc is substantially less that plating a wheel disc by a conventional process.

Other advantages of this invention will become apparent to those skilled in the art from the following detailed description of the preferred embodiment, when read in light of the accompanying drawings.

BRIEF DESCRIPTION OF THE DRAWINGS

FIG. 11 is a schematic diagram illustrating the step of loading the vehicle wheel on a six station indexing station.

FIG. 12 is a schematic diagram illustrating the step of probing the vehicle wheel.

FIG. 12A is an enlarged diagram of a selected portion of the vehicle wheel illustrated in FIG. 12.

FIG. 13 is a schematic diagram illustrating the step of applying adhesive to the vehicle wheel.

FIG. 14 is a schematic diagram illustrating the step of loading the wheel cover on a press station.

FIG. 15 is a schematic diagram illustrating the step of installing the wheel cover on the vehicle wheel.

FIG. 15A is an enlarged diagram of a selected portion of the vehicle wheel illustrated in FIG. 15.

FIG. 16 is a view taken along line 16—16 of FIG. 14 illustrating a selected portion of the press station.

DETAILED DESCRIPTION OF THE PREFERRED EMBODIMENT

Figure 1:
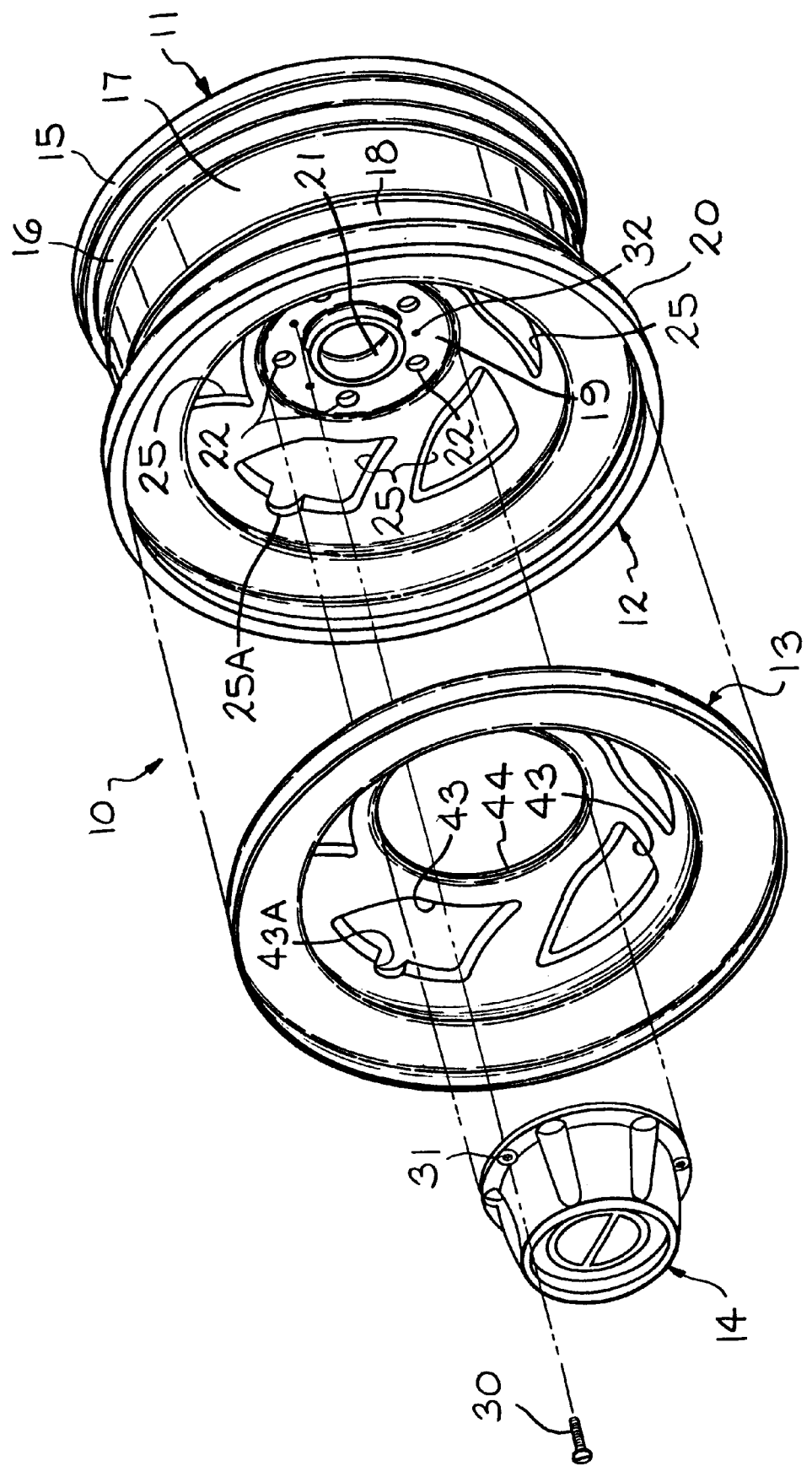
FIG. 1 is an exploded perspective view of an improved vehicle wheel constructed in accordance with the present invention.
Figure 2:
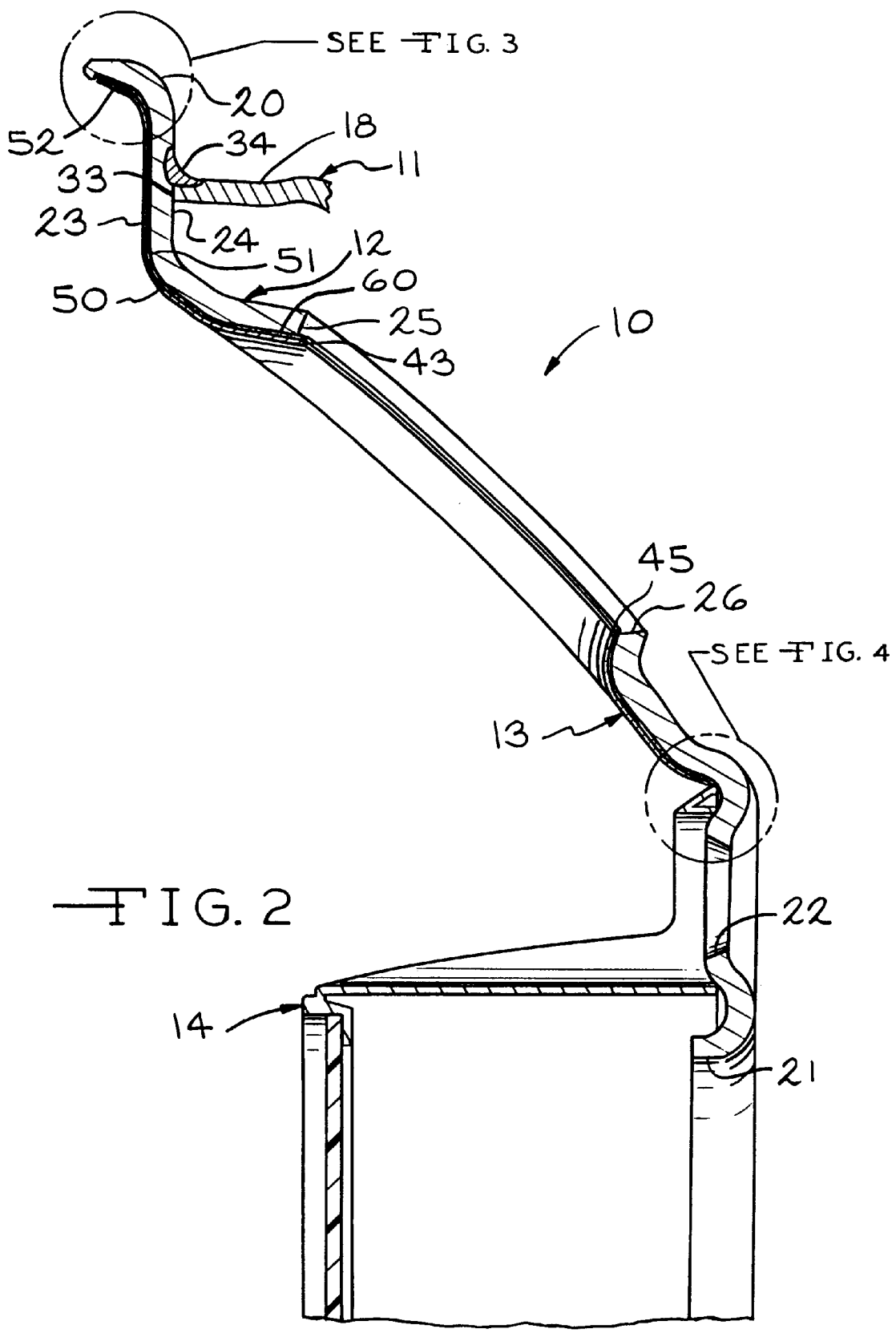
FIG. 2 is a cross-sectional view of a selected portion of the vehicle wheel illustrated in FIG. 1.
Figure 3:
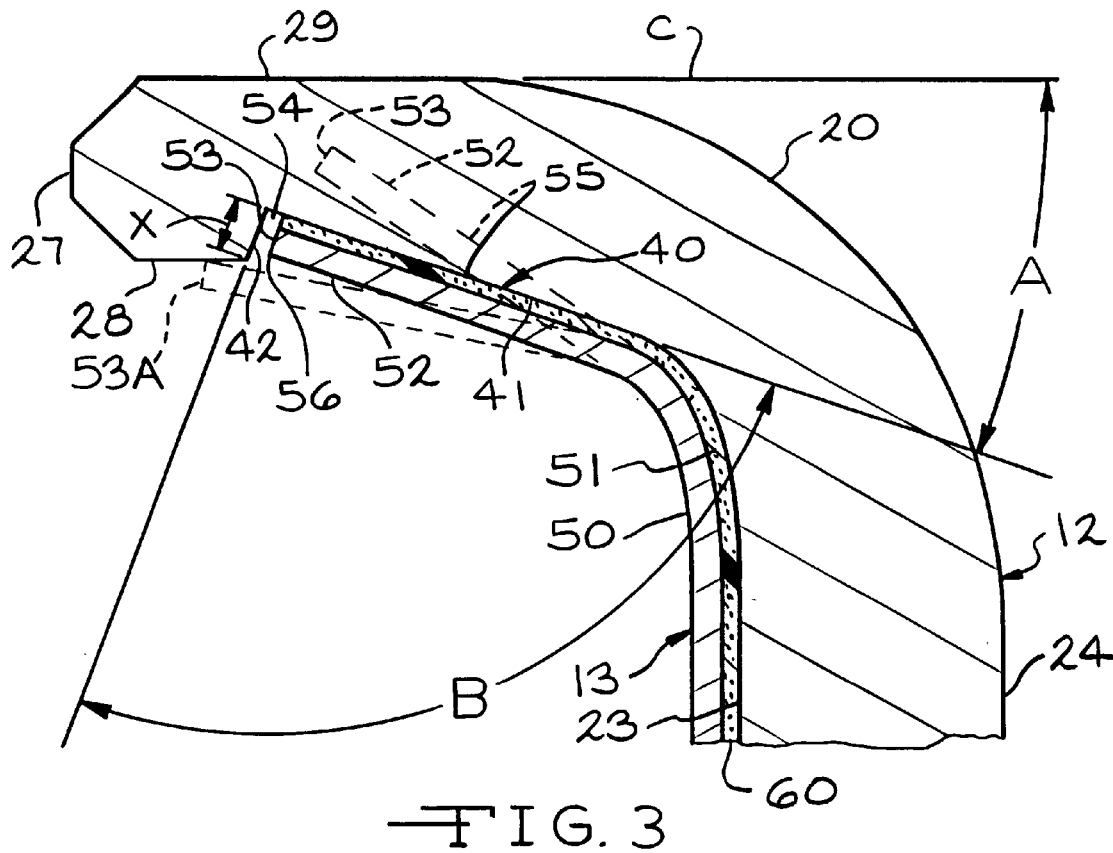
FIG. 3 is an enlarged cross-sectional view of a selected portion of the vehicle wheel illustrated in FIG. 2.
Figure 4:
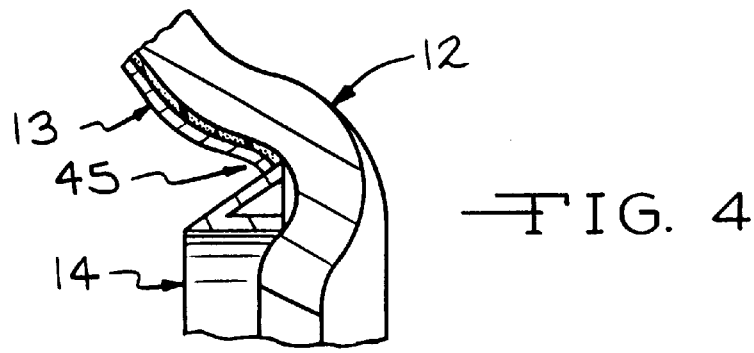
FIG. 4 is an enlarged cross-sectional view of a selected portion of the vehicle wheel illustrated in FIG. 2.

Referring now to the drawings, there is illustrated in FIGS. 1 and 2 a first embodiment of an improved vehicle wheel, indicated generally at 10, constructed in accordance with the present invention. The vehicle wheel 10 shown in this embodiment is a full face fabricated type of wheel, and includes a partial rim 11, a full face wheel disc 12, a wheel cover 13, and a cap 14. However, it will be appreciated that the invention is applicable for used with other wheel constructions. For example, the wheel can be a "bead seat attached" wheel (such as shown in FIG. 4 of U.S. Pat. No. 5,188,429 to Heck et al.), a "well attached" wheel (such as shown in FIG. 3 of U.S. Pat. No. 5,188,429 to Heck et al.), a one-piece cast or forged alloy wheel (such as shown in U.S. Pat. No. 5,078,453 to Siwek), or a wheel construction including a full face cast or forged wheel disc welded to a partial rim (such as shown in U.S. Pat. No. 5,360,261 to Archibald et al.), all of these patents incorporated herein by reference.

As shown in FIGS. 1 and 2, the rim 11 is a fabricated rim constructed of steel, aluminum, or other suitable alloy materials. The rim 11 includes an inboard tire bead seat retaining flange 15, an inboard tire bead seat 16, a generally axially extending well 17, and an outboard tire bead seat 18. The rim 11 further includes an opening (not shown) formed therein to accommodate a valve stem (not shown).

The disc 12 is a forged, cast, fabricated, or otherwise formed, and is constructed of steel, aluminum, or other suitable alloy materials. The disc 12 includes a generally centrally located wheel mounting surface 19, and an outer annular portion 20. The wheel mounting surface 19 is provided with a centrally located pilot aperture 21, and a plurality of lug bolt receiving holes 22. The lug bolt receiving holes 22 receive lug bolts (not shown) which receive nuts (not shown) for securing the wheel 10 on a vehicle axle (not shown).

The outer annular portion 20 of the disc 12 defines an outboard tire bead seat retaining flange of the wheel 10, and includes an outer surface 23 and an inner surface 24, shown in FIGS. 2 and 3. To assemble the wheel 10, an outboard end 33 of the rim 11 is positioned against the inner surface 24 of the disc 12 and a weld 34 is provided to join the disc 12 and rim 11 together as shown in FIG. 2.

As best shown in FIG. 3, the outboard tire bead seat retaining flange 20 of the disc 12 defines a radially extending outer end surface 27, an axially extending inner side surface 28, and an axially extending outer side surface 29. The disc 12 further includes a plurality of decorative windows 25 (five windows 25 being illustrated). In this embodiment, one of the windows 25 includes a cut-out 25A (shown in FIG. 1), to accommodate a valve stem (not shown).

The wheel cover 13 shown in this embodiment is preferably formed from stainless steel having a thickness of approximately 0.020 inch, and is painted or chrome plated. The wheel cover 13 is prefabricated to generally match the particular configuration of the outboard facing surface of the disc 12. In particular, the wheel cover 13 includes a plurality of openings 43 which correspond to the windows 25 formed in the disc 12, and an enlarged central opening 44. One of the openings 43 includes a cut-out portion 43A which generally corresponds to the cut-out 25A provided in the one window 25 of the disc 12 to accommodate the valve stem.

The openings 43 in the cover 13 are preferably formed by a stamping operation. Also, as best shown in FIG. 2, edges 45 of the openings 43 preferably extend slightly past edges 26 of the windows 25 to effectively overlap the edges 26 of the windows. As a result of this, when a wheel cover 13 which has been chrome plated is joined to the disc 12, the completely assembled wheel 10 of the present invention has the appearance of a "chrome plated" wheel.

Figure 5:
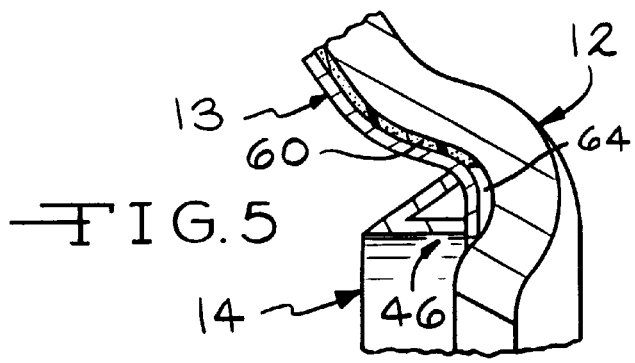
FIG. 5 is a cross-sectional view similar to FIG. 4 and showing an alternate embodiment of the vehicle wheel construction.

As shown in this embodiment, the cap 14 is secured to the disc 12 by a plurality of fasteners 30 (only one fastener 30 being illustrated). The fasteners 30 extend through openings 31 formed in the cap 14, and are received in threaded inserts 32 which are secured in openings provided in the wheel mounting surface 19 of the disc 12. The inner edge of the wheel cover 13 can either be located outside the edge of the cap 14 (as shown in FIG. 4 at 45), or, alternatively, the wheel cover 13 can extend radially inwardly under the cap 14 (as shown in FIG. 5 at 46).

The outer surface 23 of the disc 12 shown in this embodiment is provided with a circumferential, radially inwardly facing groove or recess 40. Preferably, the groove 40 is formed by a machining operation to predetermined specifications. However, the groove 40 can be formed by other methods. For example, the groove 40 can be formed by a stamping operation or a spinning operation.

As best shown in FIG. 3, the groove 40 is defined by a first surface 41 which extends in a generally axial direction, and a second surface 42 which extends in a generally radial direction a predetermined distance X. In particular, the surfaces 41 and 42 are oriented at predetermined angles A and B, respectively, relative to a reference line C which is generally parallel to the wheel axis. The angle A is in the range of 0° to 30°, and the angle B is in the range of 60° to 120°. Preferably, the angle A is approximately 20°, and the angle B is approximately 90°. As will be discussed below, the distance X is selected so that an outer annular lip of the wheel cover 13 is preferably completely recessed within the groove 40.

As shown in this embodiment, the wheel cover 13 further defines an outer surface 50, an inner surface 51, an an outer annular lip 52. The annular lip 52 of the wheel cover 13 defines an outer peripheral edge 53 which is preferably slightly spaced from the adjacent second surface 42 of the groove 40 to form a gap 54 therebetween to accommodate small dimensional changes in the outer peripheral edge 53 of the wheel cover 13; however, in some instances, depending upon the uniformity of the edge 53 dimension of the wheel cover 13, there may be some contact between the outer peripheral edge 53 of the wheel cover 13 and the second surface 42 of the groove 40. Also, the outer annular lip 52 of the wheel cover 13 is prefabricated in such a manner (as shown in phantom in FIG. 3) that, when the wheel cover 13 is positioned on the disc 12, an inner surface 55 of the lip 52 is biased outwardly against the first surface 41 of the groove 40. The outer peripheral edge 53 of the wheel cover 13 defines an inner circle 56.

Figure 6:
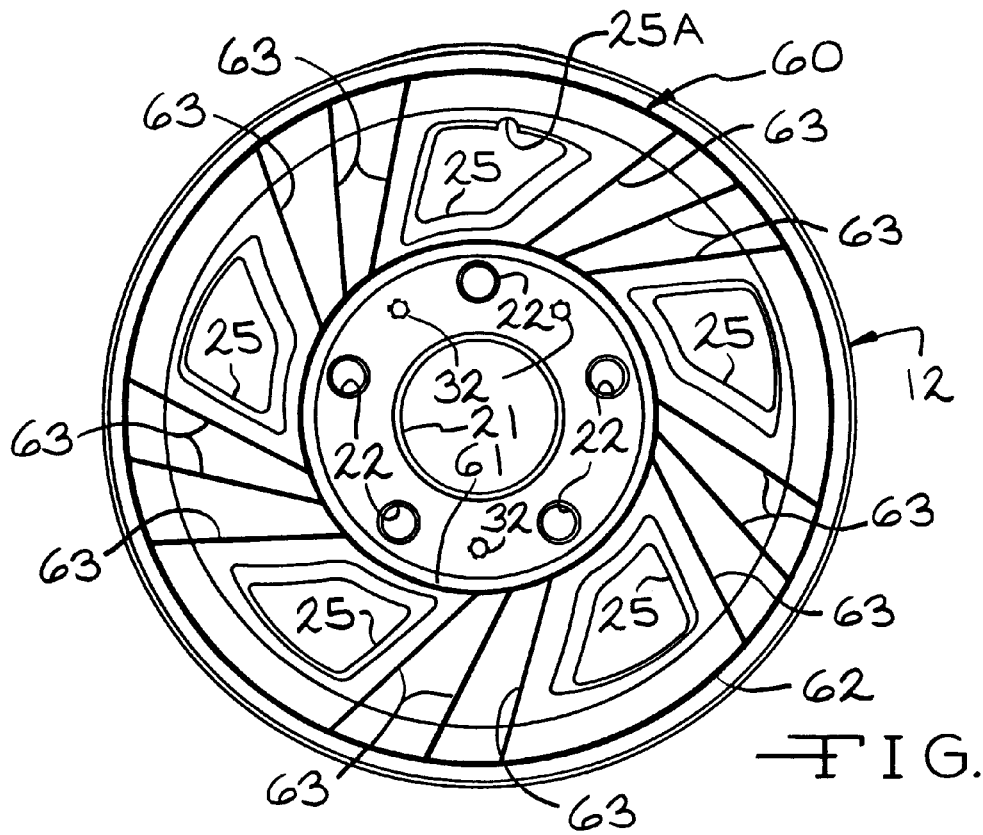
FIG. 6 is a plan view showing the adhesive pattern for the vehicle wheel illustrated in FIG. 1.

In order to permanently secure the wheel cover 13 to the disc 12, an adhesive 60, such as a two-part epoxy, is utilized. A suitable two-part epoxy is FUSOR 380/382 manufactured by Lord Corporation. As shown in FIG. 6, the adhesive 60 is preferably applied on the outboard face of the disc 12 in a predetermined pattern as represented by the heavy lines consisting of an inner circle 61, an outer circle 62, and angled radial lines 63.

As will be discussed below, the pattern of the adhesive 60 is selected so that when the wheel cover 13 is installed on the disc 12, a smearing of the adhesive 60 over substantially the entire outboard face of the disc 12 occurs. The adhesive 60 functions to permanently secure the cover 13 to the disc 12. Also, since the adhesive 60 covers substantially the entire interface between the cover 13 and the disc 12, it is effective to provide a seal and prevent water, mud, salt and other debris from entering between the cover 12 and the outboard facing surface of the disc 12. However, the pattern of the adhesive 60 creates voids or gaps 64 (see FIG. 5) in the adhesive coverage where sealing may not be required.

Preferably, the distance X of the second surface 42 of the groove 40 is at least equal to the combined thicknesses of the wheel cover 13 and the adhesive material 60 so that the inner circle 56 of the wheel cover 13 is recessed relative to the inner side surface 28 of the annular flange 20 of the disc 12. This effectively hides the outer peripheral edge 53 of the cover 13. This is also important to ensure that the wheel cover 13 does not interfere with the installation of a wheel balance weight 65 (shown in FIG. 7), on the outboard tire bead seat retaining flange of the wheel 10.

Figure 7:
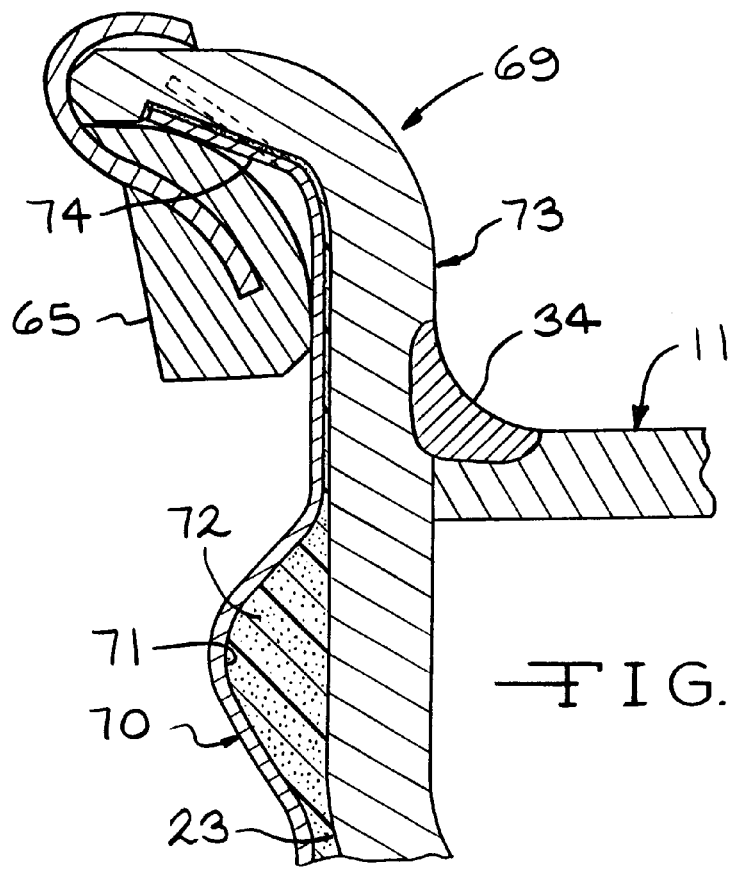
FIG. 7 is a cross-sectional view similar to FIG. 3, and showing an alternate embodiment of a vehicle wheel construction.

FIG. 7 illustrates a second embodiment of a vehicle wheel, indicated generally at 69, having a wheel cover 70 which is similar to the wheel cover 13 shown in FIGS. 1–3, except that the wheel cover 70 has a styled configuration different from the associated wheel disc 73. This enhances the styling of the associated vehicle wheel as compared to the disc 73. It also enables different styled covers to be used with a common disc 73.

In particular, the wheel cover 70 includes a predetermined profile which positions an inner surface 71 thereof a substantial distance from the outboard facing surface of the disc 73. In this embodiment, an expandable foam adhesive material 72 is used to permanently secure the wheel cover 70 to the disc 73. Preferably, the adhesive material 72 is applied to the outer surface of the disc 73 in a predetermined pattern so that when the adhesive material 72 expands, it covers substantially the entire interface between the wheel cover 70 and the disc 73. The adhesive material 72 functions to permanently secure the wheel cover 70 to the disc 73, and prevents water, mud, and other debris from entering therebetween. Also, the wheel cover 70 includes an outer annular lip 74 which is prefabricated and secured in a manner similar to that discussed above with respect to the wheel cover 13 of FIGS. 1–3.

Figure 8:
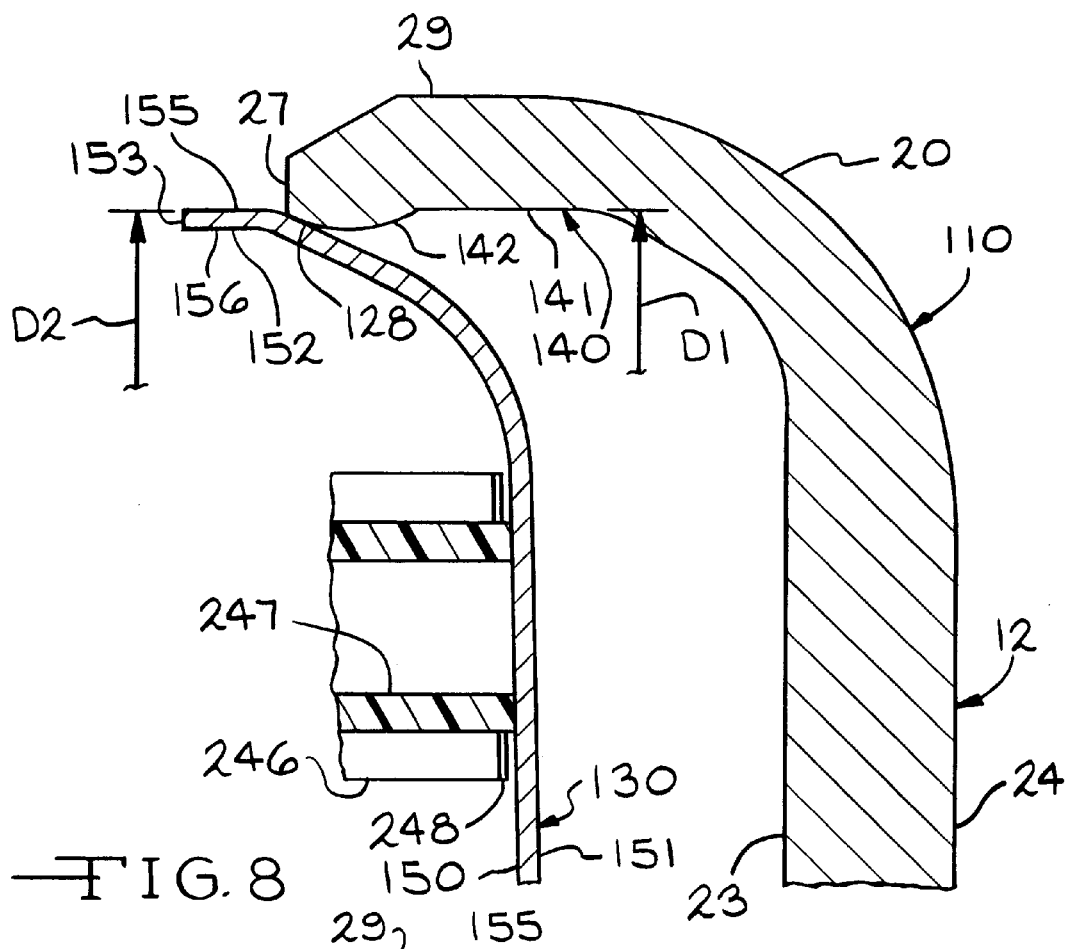
FIG. 8 is a cross-sectional view similar to FIG. 3, and showing yet another alternate embodiment of a vehicle wheel construction prior to complete installation of the wheel cover.
Figure 9:
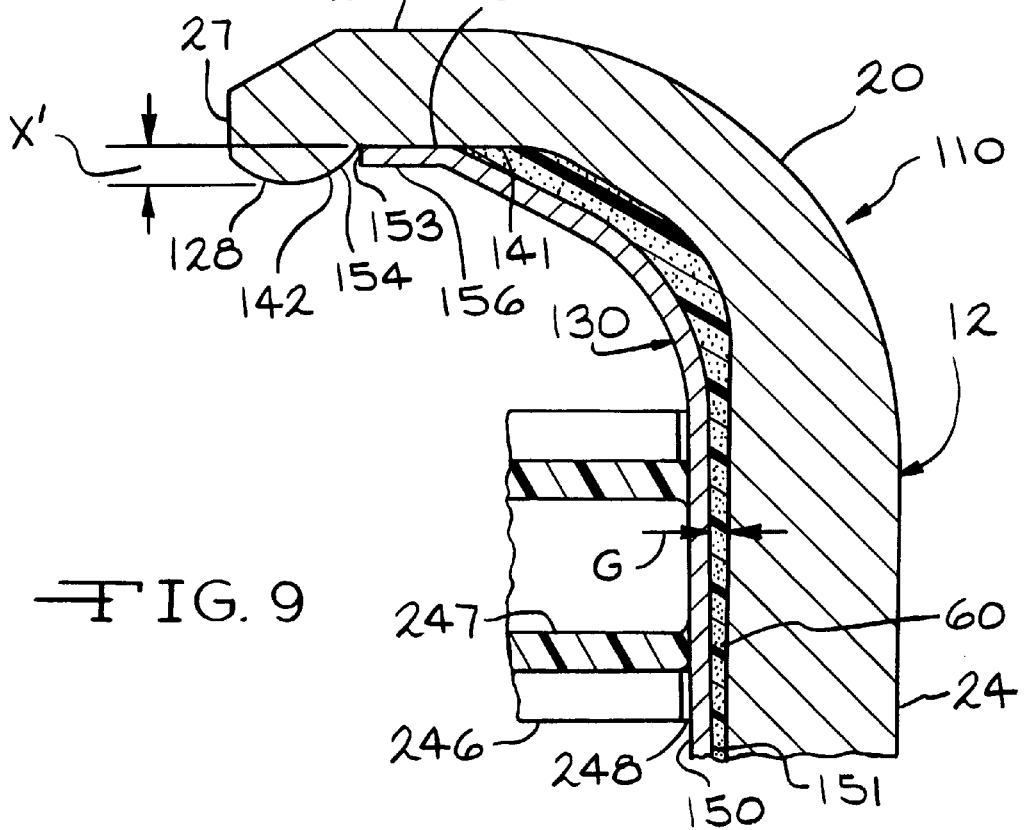
FIG. 9 is a view similar to FIG. 8 after the wheel cover has been installed.

Referring now to FIGS. 8 and 9 and using reference numbers which refer to same parts, there is illustrated a selected portion of a third embodiment of a vehicle wheel, indicated generally at 110 in FIG. 9, which is similar to the vehicle wheel 10 shown in FIGS. 1–3, except that the groove and the adjacent portion of the wheel cover shown in this embodiment have a different structure than those illustrated in FIGS. 1–3 to minimize paint damage by the cover during installation thereof.

As shown in this embodiment, the outer surface 23 of the disc 12 is provided a groove 140. The groove 140 defines a first surface 141 which extends in a generally axial direction, and a second surface 142 which extends in a generally radial direction a predetermined distance X'. In particular, the first surface 141 is generally parallel to the wheel axis and defines a first inner wheel diameter D1. As will be discussed below, the distance X' is selected so that an outer annular lip of the wheel cover 130 is preferably completely recessed within the groove 140.

The wheel cover 130 shown in this embodiment defines an outer annular lip 152 which extends in a generally axial direction and includes an inner surface 155 and an outer surface 156 which are generally parallel to one another and to the first surface 141 of the groove 140. The inner surface 155 of the annular lip defines an outer diameter D2 which is slightly greater than the first inner wheel diameter D1 defined by the first surface 141 of the groove 140. As a result, when the cover 130 is installed on the disc 12, the inner surface 155 of the lip 152 is biased outwardly against the first surface 141 of the groove 140.

Also, the distance X' of the second surface 142 of the groove 140 is preferably at least equal to the thickness of the wheel cover 130 so that the outer surface 156 of the annular lip 152 is recessed relative to the inner side surface 128 of the annular flange 20 of the disc 12. This effectively hides an endmost surface or edge 153 of the wheel cover 130. This is also important to ensure that the wheel cover 130 does not interfere with the attachment of the wheel balance weight. In addition, the endmost surface 153 of the annular lip 152 of the wheel cover 130 is preferably slightly spaced from the adjacent second surface 142 of the groove 140 to form a gap 154 therebetween to accommodate small dimensional changes in the endmost surface 153 of the wheel cover 130; however, in some instances, depending upon the uniformity of the endmost 153 dimension of the wheel cover 130, there may be some contact between the endmost surface 153 of the wheel cover 130 and the second surface 142 of the groove 140.

Figure 10:
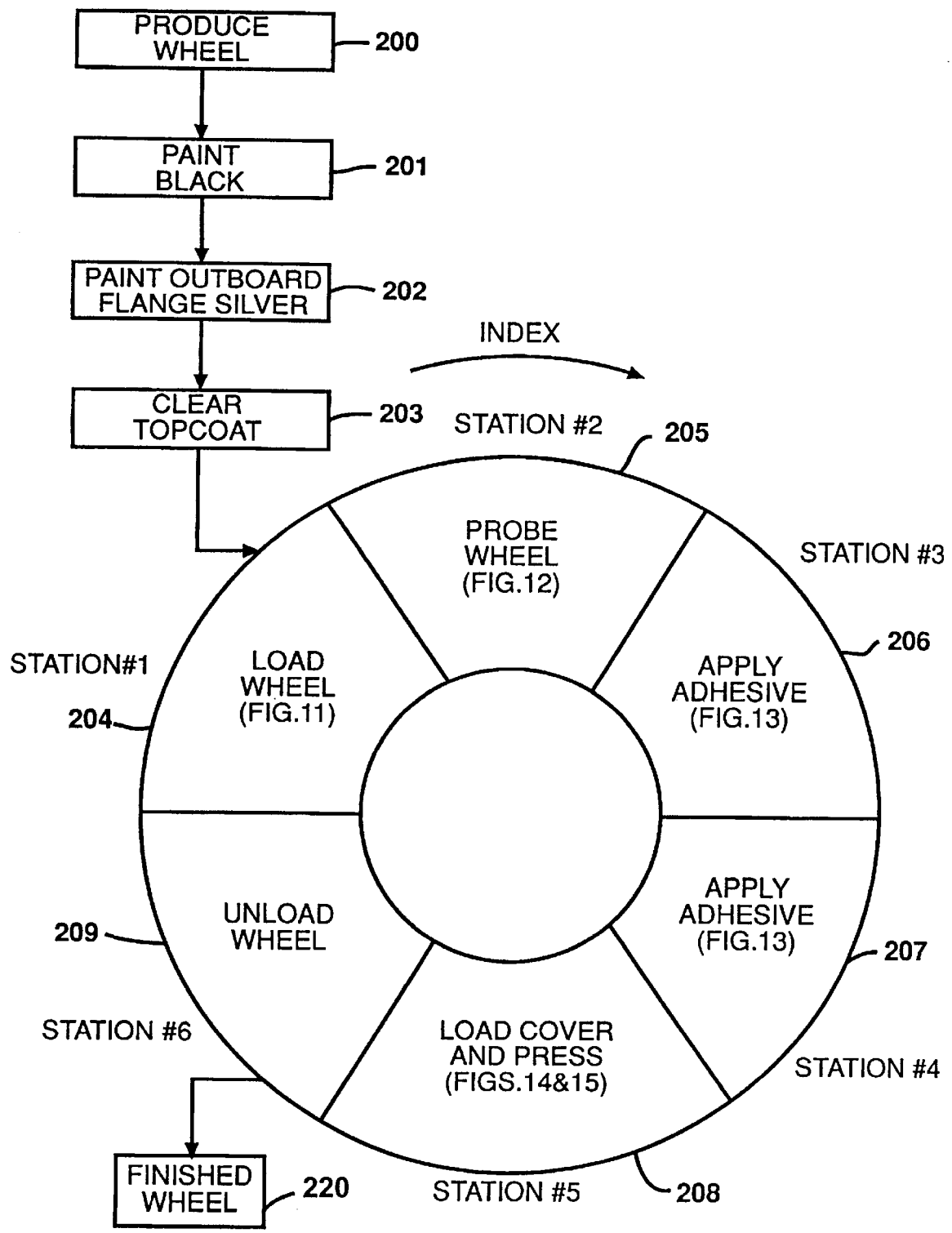
FIG. 10 is a block diagram illustrating a sequence of steps for producing the vehicle wheel of the present invention.

Turning now to FIG. 10, a sequence of steps for producing an improved vehicle wheel 110 constructed in accordance with the present invention will be discussed. Initially, in step 200, a vehicle wheel, indicated generally at 220 in FIG. 11, is provided. The vehicle wheel 220 includes a partial rim 11 joined to a full face disc 12 by a weld. Next, in step 201, preferably the entire wheel 220 is painted black. In step 202, preferably only the outboard tire bead seat retaining flange 20 of the wheel 220 is painted silver. Following this, in step 203, the outboard facing surface of the disc 12 and the outboard tire bead seat retaining flange 20 are painted with a clear topcoat.

The wheel 220 is then transported to a six station rotary index table and, in step 204, the wheel 220 is loaded onto a wheel support fixture 230, shown in FIG. 11. The wheel support fixture 230 includes an upstanding center post 237 and an upstanding locating stud 231. The outer diameter of the post 237 is slightly smaller than the diameter of the pilot aperture formed in the disc 12, and the outer diameter of the stud 231 is slightly smaller than the diameter of the lug bolt receiving hole formed in the disc 12. The stud 231 is provided to enable an operator to load the wheel 220 on the fixture 230 in a predetermined position. In particular, the operator loads the wheel 220 onto the wheel support fixture 230 with the locating stud 231 extending through a selected one of the lug bolt mounting holes so that the wheel 220 is supported by fixture 230 with the valve stem hole cut-out portion 25A in the one wheel window 25 located in a predetermined position relative to the stud 231.

The wheel 220 is then indexed to Station #2 in step 205. As shown in FIG. 12, at Station #2, the wheel 220 is slightly lifted upwardly off of support fixture 230 by a pair of retractable arms 232 and 233. The arms 232 and 233 are movable between an retracted position (not shown), wherein the arms do not engage the wheel 220, and an extended position, wherein the arms 232 and 233 are operative to engage the inner surface 24 of the disc 12 in order to lift the wheel 220 off of the fixture 230 as shown in FIG. 12. In the extended position, the stud 231 still extends through the lug bolt hole to prevent relative movement between the wheel 220 and the fixture 230.

Once the arms 232 and 233 engage and support the wheel 220, an annular plate 234 is moved downwardly and engages the outer surface 23 of the disc 12 of the wheel 220. The plate 234 is operatively connected to a probe 235, and is operative to determine a distance E, best shown in FIG. 12A, which represents the distance between an upper surface of the arms 232 and 233 and the outer surface 23 of the disc 12. The probe 235 is operatively connected to a machine control 238 which receives and stores the distance E measured by the probe 235. Preferably, at the same time, a valve hole detector 236 is actuated and is operative to identify that the wheel 220 was correctly oriented on the fixture 230 by the operator at Station #1.

Next, the wheel 220 is indexed to Station #3 in step 206. As shown in FIG. 13, Station #3 is operative to apply the adhesive 60 to a portion of the outboard facing surface of the wheel 220. To accomplish this, Station #3 includes a movable wand 239 which is connected via a conduit 240 to an adhesive reservoir 241. The wand 239 is connected to a robot control 242 which is operative to control the movement of the wand 239 so that the adhesive 60 is applied in a predetermined pattern. The wheel 220 is then indexed to Station #4 in step 207. Station #4 is similar to Station #3 and applies adhesive 60 to another portion of the wheel 220 to complete the predetermined adhesive pattern.

Once the adhesive 60 is applied to the wheel 220 in steps 206 and 207, the wheel 220 is indexed to Station #5 in step 208. At Station #5, a wheel cover 130 is loaded onto a cover support fixture 244 as shown in FIG. 14. As best shown in FIG. 16, the cover support fixture 244 includes an annular metal disc 245, a segmented annular plastic ring 246, and a plurality of suction cups 247 located at the breaks in the segmented plastic ring 246. The plastic ring 246 is constructed of a hard plastic material, such as for example delrin, and preferably is covered with a removable protective film or coating 248. The suction cups 247 are constructed of a resilient rubber material. Also, a locating stud 249 is attached to the ring 245.

At Station #5, an operator positions the cover 130 on the fixture 244 with the cut-out portion 43A of the one wheel window 43 located on the stud 249. As a result, the wheel cover 130 is positioned and held on the fixture 244 via the suction cups 247 in a predetermined position. Next, the fixture 244 is pivoted upwardly in the direction of the arrow R to the position shown in phantom.

Following this, the fixture 244 is moved downwardly and presses the wheel cover 130 onto the wheel 220 as shown in FIG. 15. To accomplish this, the wheel 220 is first supported by a pair of arms 232' and 233' which are similar to the arms 232 and 233 discussed above. Once the wheel 220 is supported by the arms 232' and 233', the fixture 244 is actuated and is operative to press the wheel cover 130 onto the wheel 220 to a predetermined position. In particular, the fixture 244 is operatively controlled by the machine control 238 which received and stored the signal representing the distance E measured in step 205 and using this stored signal, is operative to control the fixture 244 and press the wheel cover 130 onto the wheel 220 and to space the outer surface 150 of the wheel cover 130 a predetermined distance F from an outer surface of the arms 232' and 233'. The distance F is generally equal to the sum of the distance A, the thickness of the wheel cover 130, and a desired adhesive thickness denoted in FIG. 15A as G. Thus, during step 208, the machine control 238 is effective to accurately control pressing of the wheel cover downwardly onto the disc to ensure that the annular lip is properly positioned in the groove and that there is a sufficient thickness of adhesive at the interface between the disc and the wheel cover.

The operation of pressing the wheel cover 130 onto the wheel 220 is more clearly illustrated in the embodiment of the wheel 110 illustrated in FIGS. 8 and 9.

As shown therein, the suction cups 247 are operative to hold the wheel cover 130 as it is moved toward the outer surface 23 of the disc 12. Initially, the inner surface 151 of the wheel cover 130 engages the surface 128 of the flange 20 of the disc 12, shown in FIG. 8, and biases the outer annular lip 152 of the cover 130 inwardly. Further movement of the cover 130 toward the disc 12 is operative to move the edge 153 of the lip 152 past the second surface 142 of the groove 140 and allows the annular lip 152 to spring back so that the inner surface 155 of the annular lip 142 engages the first surface 141 of the groove 140. The cover 130 is further moved toward the disc 12 until the outer surface 150 of the cover 130 is a predetermined distance F, best shown in FIG. 15 A, relative to the upper surface of the arms 232' and 233'.

As shown in FIG. 9, during this movement, the suction cups 247 collapse so that the plastic ring 246 is operative to engage the adjacent surface 150 of the cover 130. As a result of this, a predetermined distance G is maintained as a gap between the outer surface 23 of the disc 12 which was measured by the probe in step 205 and the adjacent inner surface 151 of the cover 130. It is important to maintain this distance G to ensure that a sufficient amount of adhesive is present to create a sufficient adhesive bond to permanently secure the wheel cover to the disc during step 208.

It should be apparent that during the installation of the wheel cover, the inner surface of the outer annular lip of the wheel cover contacts and is dragged along the adjacent outer surface of the disc. As a result of this, when a fairly rigid wheel cover is utilized (such as a stainless steel wheel cover), damage to the paint on the disc can occur during installation of the wheel cover. Applicants have discovered that damage to the paint on the surface of the disc can be minimized by carefully designing the structure of the outer annular lip of the wheel cover, the outer surface of the disc, or preferably the structure of both the wheel cover and the disc. In particular, it is desirable to design the wheel cover and the disc so that when the wheel cover is installed, there is as little as possible direct edge or point contact between the wheel cover and the disc. Thus, it should be apparent that in the design illustrated in FIG. 3, the peripheral edge 53A (shown in phantom in FIG. 3) of the wheel cover 13 scrapes the inner surface 28 of the disc 12 as the edge 53A is pushed along the surface 28 during installation of the wheel cover 13; however, in the design illustrated in FIGS. 8 and 9, the rounded portion of the wheel cover 130 initially engages the surface 128 of the disc 12 and then the inner surface 155 of the wheel cover 130 is pushed along the surface 128 of disc 12 during the installation of the wheel cover 130. The edge 153 of the wheel cover 130 contacts disc 12 only after the edge 153 is moved past the surface 128 and expands outwardly into the groove 140 as shown.

Following step 208, the wheel 220 is indexed to Station #6 in step 209, and the finished wheel 220 is unloaded from rotary index table.

The method of the present invention can be practiced to produce a vehicle wheel which includes a wheel cover 130, which preferably is chrome-plated, an outer portion of the outboard tire bead seat retaining flange of the disc, which preferably is painted silver, and having the remaining visible portions of the wheel which can be seen through the windows in the disc painted black.

While the present invention has been described and illustrated as installing the wheel cover on a wheel assembly including a rim joined to a disc, the wheel cover can be installed on the disc prior to joining the disc to the rim.

In accordance with the provisions of the patent statutes, the principle and mode of operation of this invention have been described and illustrated in its preferred embodiment. However, it must be understood that the invention may be practiced otherwise than as specifically explained and illustrated without departing from the spirit or scope of the attached claims.

What is claimed:

1. A method for securing a wheel cover to a vehicle wheel comprising the steps of:

(a) providing a vehicle wheel including an outboard tire bead seat retaining flange and a wheel disc, the retaining flange and the wheel disc cooperating to define an outboard surface of the vehicle wheel, the wheel disc having a plurality of windows formed therein;

(b) providing a wheel cover having an outer surface and an inner surface, the wheel cover having a plurality of decorative openings formed therein which correspond to the windows formed in the wheel disc, the wheel cover being formed so as to cover at least the portion of the wheel disc which includes the windows;

(c) applying an adhesive to one of the vehicle wheel outboard surface and the wheel cover inner surface in a pattern which functions to secure the wheel cover to the vehicle wheel, the adhesive pattern including an outer circle of adhesive for contact with an outer peripheral portion of the wheel cover and an inner circle of adhesive for contact with an inner peripheral portion of the wheel cover, the adhesive pattern further extending around each of the plurality of openings in the wheel cover; and (d) assembling the wheel cover to the vehicle wheel to cause the adhesive to contact both the vehicle wheel outboard surface and the wheel cover inner surface and thereby enable the adhesive to secure the wheel cover to the vehicle wheel, and to maintain a gap between selected portions of the vehicle wheel outboard surface and the wheel cover inner surface, and wherein the adhesive applied in step (c) fills less than the entire gap so as to produce at least one void in the area between adjacent openings in the wheel cover, the adhesive pattern being effective to prevent water, mud, and debris from entering the void.

2. The method according to claim 1 wherein the adhesive pattern determined in step (c) includes at least two spaced apart lines of adhesive extending between the inner circle of adhesive and the outer circle of adhesive and disposed between each adjacent pair of the openings in the wheel cover.

3. The method according to claim 1 wherein the inner surface of the wheel cover is formed so as to generally match the configuration of the vehicle wheel outboard surface.

4. The method according to claim 1 wherein each of the wheel cover openings includes an edge which extends slightly past an adjacent edge of each of the wheel disc windows to effectively overlap the edge of each of the windows.

5. The method according to claim 1 wherein the outboard tire bead seat retaining flange is formed integral with the wheel disc as part of a full face wheel disc.

6. The method according to claim 1 wherein the vehicle wheel is constructed of steel.

7. The method according to claim 1 wherein the vehicle wheel is constructed of aluminum.

8. The method according to claim 1 wherein the wheel cover is constructed of stainless steel.

9. The method according to claim 1 wherein the wheel cover outer surface is chrome plated.

10. The method according to claim 1 wherein portions of the wheel cover inner surface are spaced apart from the vehicle wheel outboard surface.

11. The method according to claim 10 wherein an expandable foam adhesive material is used between the spaced apart surfaces.

12. The method according to claim 1 wherein the outer peripheral portion of the wheel cover covers only a portion of the outboard tire bead seat retaining flange and the inner peripheral portion of the wheel cover extends up to but does not cover a plurality of lug bolt holes formed in the wheel disc.

13. The method according to claim 1 wherein the wheel cover covers only a portion of the outboard tire bead seat retaining flange.

14. The method according to claim 13 wherein the outer surface of the wheel cover is chrome plated and the uncovered portion of the outboard tire bead seat retaining flange is painted silver.

15. A vehicle wheel produced according to the method defined in claim 1.

* * * * *